US012046170B2

(12) United States Patent
Holmes et al.

(10) Patent No.: US 12,046,170 B2
(45) Date of Patent: Jul. 23, 2024

(54) DISPLAY BOARD, METHODS OF USE, METHODS OF MANUFACTURE, AND RELATED SYSTEMS AND APPARATUSES THEREOF

(71) Applicant: HOBO INDUSTRIES, INC., Holliston, MA (US)

(72) Inventors: Jacqueline Holmes, Holliston, MA (US); Matthew Bowie, Holliston, MA (US); James Holmes, Holliston, MA (US)

(73) Assignee: HoBo Industries, Inc., Holliston, MA (US)

(*) Notice: Subject to any disclaimer, the term of this patent is extended or adjusted under 35 U.S.C. 154(b) by 0 days.

(21) Appl. No.: 18/195,057

(22) Filed: May 9, 2023

(65) Prior Publication Data

US 2023/0368711 A1 Nov. 16, 2023

Related U.S. Application Data

(60) Provisional application No. 63/340,178, filed on May 10, 2022.

(51) Int. Cl.

*G09F 15/00* (2006.01)
*G09F 1/06* (2006.01)
*G09G 3/00* (2006.01)

(52) U.S. Cl.

CPC ............ *G09G 3/035* (2020.08); *G09F 1/065* (2013.01); *G09G 2360/04* (2013.01)

(58) Field of Classification Search

CPC ................ G09G 3/035; G09G 2360/04; G09F 1/065; G09F 15/068; G09F 15/0012; G09F 1/02; A47B 96/202

(Continued)

(56) References Cited

U.S. PATENT DOCUMENTS

| | | | |
|---|---|---|---|
| 1,894,902 | A | 1/1933 | Carmichael |
| 2,897,977 | A | 8/1959 | Buttery |

(Continued)

FOREIGN PATENT DOCUMENTS

| | | | |
|---|---|---|---|
| DE | 19737211 | A1 | 3/1999 |
| DE | 202004000848 | U1 | 5/2004 |
| EP | 1830335 | A2 | 9/2007 |

OTHER PUBLICATIONS

Aug. 25, 2023, International Search Report and Written Opinion of the ISAin PCT/US23/21484.

*Primary Examiner* — Abdul-Samad A Adediran
(74) *Attorney, Agent, or Firm* — Mei & Mark LLP

(57) ABSTRACT

A display board is provided. The display board may include a left panel, a left-middle panel, a center panel, a right-middle panel, a right panel, a left-top fold section, a right-top fold section, a left-bottom fold section, and/or a right-bottom fold section. The display board may be configured to be placed in at least a display configuration and a closed configuration. The left panel and the left-middle panel may intersect with an exterior orientation. The right-middle panel and the center panel may intersect with the interior orientation. The right panel and the right-middle panel may intersect with the exterior orientation. The left-middle panel and the center panel may intersect with an interior orientation. The front sides of panels that intersect at the exterior orientation may face away from each other in the display configuration and in the closed configuration. The back sides of panels that intersect at the interior orientation may face away each other in the display configuration and in the closed configuration.

20 Claims, 7 Drawing Sheets

(58) Field of Classification Search
USPC .................. 40/539, 610; 211/85.26; 156/204
See application file for complete search history.

(56) References Cited

U.S. PATENT DOCUMENTS

| | | | | |
|---|---|---|---|---|
| 3,654,717 | A * | 4/1972 | Lane ......................... | G09F 1/02 156/204 |
| D286,108 | S | 10/1986 | Hanlon | |
| 4,759,520 | A | 7/1988 | Levine | |
| 5,632,390 | A | 5/1997 | Podergois | |
| 7,647,718 | B2 | 1/2010 | Burtch | |
| 7,886,465 | B2 | 2/2011 | Virvo | |
| D754,254 | S | 4/2016 | Dashe | |
| D787,599 | S | 5/2017 | Dashe | |
| 9,741,266 | B2 | 8/2017 | Dashe | |
| 10,170,024 | B1 | 1/2019 | McGrath et al. | |
| 10,347,162 | B2 | 7/2019 | McGrath | |
| 10,565,906 | B1 | 2/2020 | Ivescu | |
| 10,600,344 | B1 | 3/2020 | Lorenzini | |
| D884,396 | S | 5/2020 | Schulman | |
| D885,803 | S | 6/2020 | Schulman | |
| 2004/0083631 | A1 | 5/2004 | Zakova | |
| 2004/0148833 | A1* | 8/2004 | Virvo .................. | G09F 15/0068 40/610 |
| 2005/0086842 | A1* | 4/2005 | Ternovits ............ | G09F 15/0012 40/539 |
| 2006/0048421 | A1 | 3/2006 | Oleksak | |
| 2007/0102384 | A1* | 5/2007 | Albenda .............. | A47B 96/202 211/85.26 |

* cited by examiner

DISPLAY BOARD, METHODS OF USE, METHODS OF MANUFACTURE, AND RELATED SYSTEMS AND APPARATUSES THEREOF

RELATED SYSTEMS AND APPARATUSES THEREOF

This application claims priority to U.S. Provisional Patent Application Ser. No. 63/340,178, filed on May 10, 2022, the disclosure of which is hereby incorporated by reference in its entirety.

TECHNICAL FIELD

This application relates to presentation boards and, more specifically, self-standing display boards. The teachings of this disclosure may also be applicable to re-configurable self-standing structures and/or other display boards outside of the presentation context.

BACKGROUND

Individuals, organizations, and companies have a plethora of presentation board options to choose from when preparing visual presentation materials. However, commercially-available presentation boards may generally be categorized as either low-end or high-end. Low-end presentation boards, for example, commonly available tri-fold cardboard display boards, are low-cost and may be lightweight; however, such low-end boards may be easily damaged, be flimsy, and/or appear cheap, thereby undermining the presentation or sales pitch such boards are used for. High-end presentation boards are customizable and may appear impressive to the presenter's intended audience, but they are often expensive, heavy, bulky, and/or difficult to manage.

A presentation board product that is economical, customizable, easily portable, readily storable, light weight, durable, and/or impressive-looking is desired by the market. It would further be advantageous for such presentation board to be easily and quickly set-up and taken down.

SUMMARY

The present disclosure provides a description of display boards to address the perceived problems described above, methods of manufacture, methods of use, and related systems thereof. It is to be understood that the descriptions herein are exemplary and explanatory only and are not restrictive of the inventive concepts disclosed.

In one embodiment, a display board is provided. The display board may include a left panel, a left-middle panel, a center panel, a right-middle panel, a right panel, a left-top fold section, a right-top fold section, a left-bottom fold section, and/or a right-bottom fold section. The display board may be configured to be placed in at least a display configuration and a closed configuration.

The left panel and the left-middle panel may intersect with an exterior orientation. The left-middle panel and the center panel may intersect with an interior orientation. The right-middle panel and the center panel may intersect with the interior orientation. The right panel and the right-middle panel may intersect with the exterior orientation. The front sides of panels that intersect at the exterior orientation may face away from each other in the display configuration and in the closed configuration. The back sides of panels that intersect at the interior orientation may face away each other in the display configuration and in the closed configuration.

The left-top fold section may further include a left-top fold panel, a left-top middle fold panel, and a left-top center fold panel. The right-top fold section may further include a right-top fold panel, a right-top middle fold panel, and a right-top center fold panel. The left-bottom fold section may further include a left-bottom fold panel, a left-bottom middle fold panel, and a left-bottom center fold panel. The right-bottom fold section may further include a right-bottom fold panel, a right-bottom middle fold panel, and a right-bottom center fold panel.

The left-top fold panel and the left-top middle fold panel may intersect with an interior orientation. The left-top middle fold panel and the left-top center fold panel may intersect with an exterior orientation. The right-top fold panel and the right-top middle fold panel may intersect with an interior orientation. The right-top middle fold panel and the right-top center fold panel may intersect with an exterior orientation. The left-bottom fold panel and the left-bottom middle fold panel may intersect with an interior orientation. The left-bottom middle fold panel and the left-bottom center fold panel may intersect with an exterior orientation. The right-bottom fold panel and the right-bottom middle fold panel may intersect with an interior orientation. The right-bottom middle fold panel and the right-bottom center fold panel may intersect with an exterior orientation.

The front surface of the display board may contain imagery. The imagery may not span across any panel intersection that corresponds to the exterior orientation.

The display board may substantially consist of corrugated plastic with vertically oriented fluting. The back surface of the display board may be cut at each panel intersection that corresponds to an interior orientation. The front surface of the display board may cut at each panel intersection that corresponds to an exterior orientation.

The display board may substantially consist of foam core board. The back surface of the display board may be scored at each panel intersection that corresponds to an interior orientation. The front surface of the display board may be scored at each panel intersection that corresponds to an exterior orientation.

The display board may further include a central fold the vertically bisects the center panel. The back surface of the display board may be scored or cut along the central fold and/or the front surface of the display board may be scored or cut along the central fold.

In another embodiment, the display board may include a left panel, a left-middle panel a center panel, a right-middle panel, a right panel, and a first fold section. The display board may be configured to be placed in at least a display configuration and a closed configuration.

The left panel and the left-middle panel may intersect with an exterior orientation. The left-middle panel and the center panel may intersect with an interior orientation. The right-middle panel and the center panel may intersect with the interior orientation. The right panel and the right-middle panel may intersect with the exterior orientation. The front sides of panels that intersect with the exterior orientation may face away from each other in the display configuration and in the closed configuration. The back sides of panels that intersect with the interior orientation may face away each other in the display configuration and in the closed configuration.

The first fold section may include a first outer fold panel, a first middle fold panel, and a first center fold panel. The first outer fold panel and the first middle fold panel may intersect with an interior orientation. The first middle fold panel and the first center fold panel may intersect with an exterior orientation.

The display board may further include a second fold section. The second fold section may include a second outer fold panel, a second middle fold panel, and a second center fold panel. The second outer fold panel and the second middle fold panel may intersect with an interior orientation. The second middle fold panel and the second center fold panel intersect with an exterior orientation.

The left panel and the left-middle panel may intersect with an interior orientation. The left-middle panel and the center panel may intersect with an exterior orientation. The right-middle panel and the center panel may intersect with the exterior orientation. The right panel and the right-middle panel may intersect with the interior orientation. The first fold section further may include a first outer fold panel, a first middle fold panel, and a first center fold panel. The first outer fold panel and the first middle fold panel may intersect with an exterior orientation. The first middle fold panel and the first center fold panel may intersect with an interior orientation. The front sides of panels that intersect at the exterior orientation may face away from each other in the display configuration and in the closed configuration. The back sides of panels that intersect at the interior orientation face away each other in the display configuration and in the closed configuration.

BRIEF DESCRIPTION OF THE DRAWINGS

The accompanying drawings, which are incorporated into and constitute a part of this specification, illustrate several embodiments and aspects of the apparatuses and methods described herein and, together with the description, serve to explain the principles of the invention.

DETAILED DESCRIPTION

Display Board 100

Figure 2A:
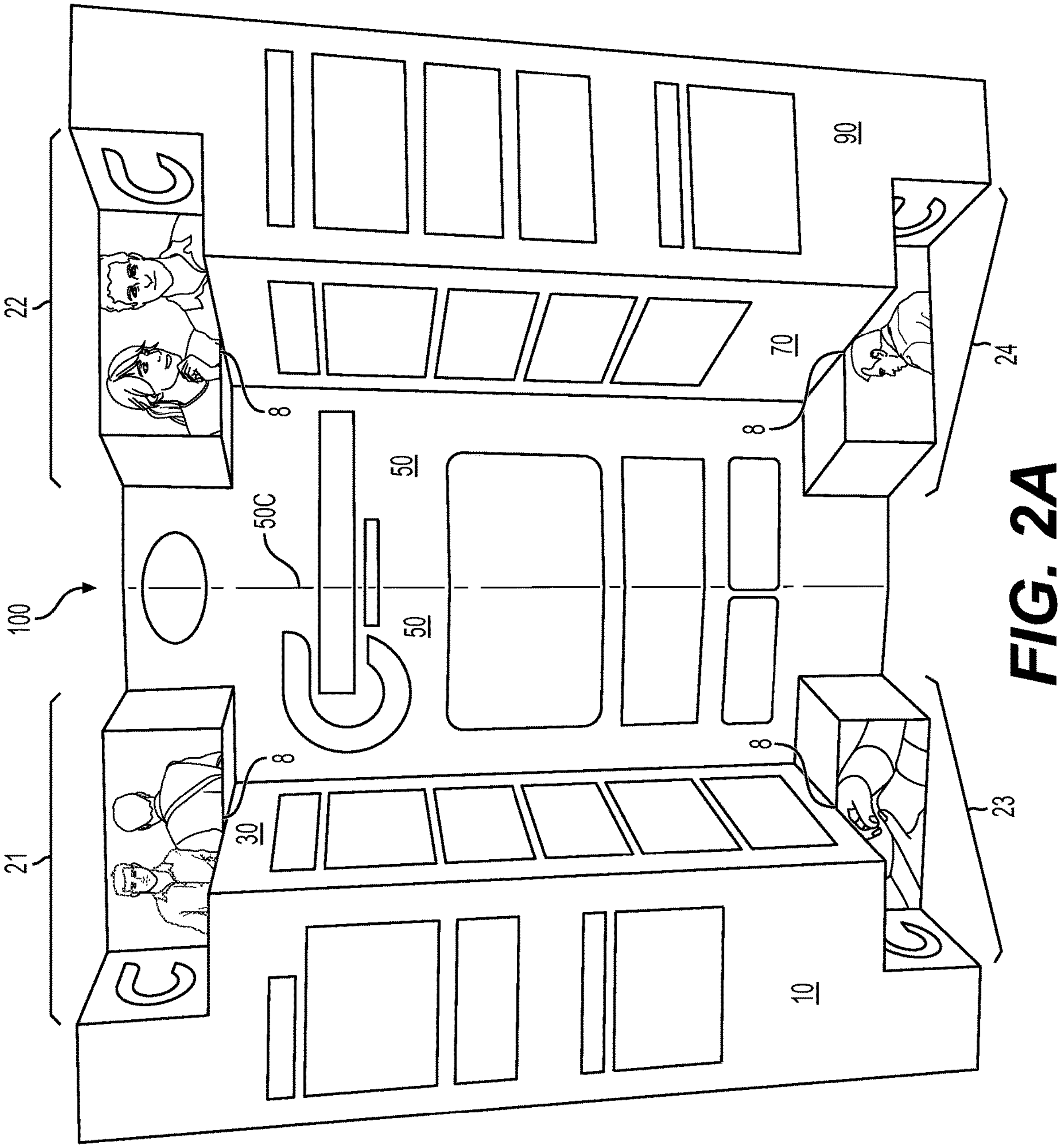
FIGS. 2A, 2B, and 2C are drawings of a display board specimen in a display configuration from front, back, and partial top detail views, respectively, in accordance with exemplary embodiments.
Figure 2C:
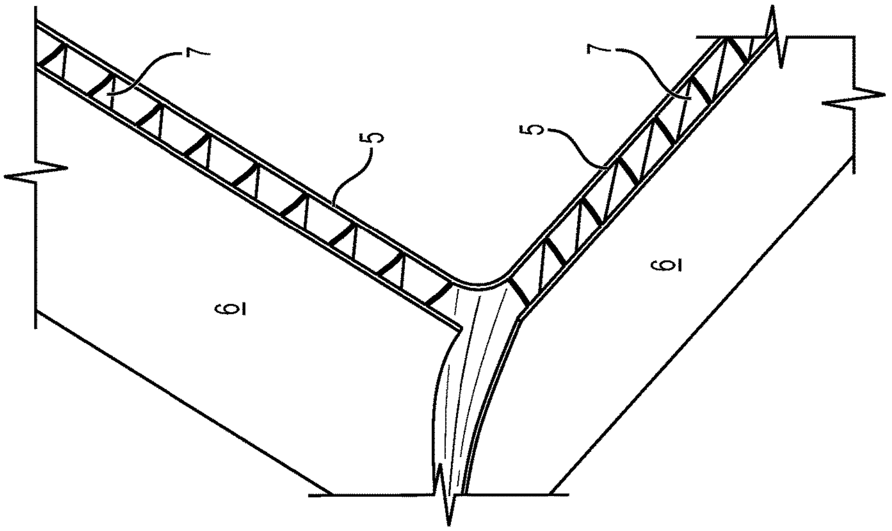
Figure 2B:
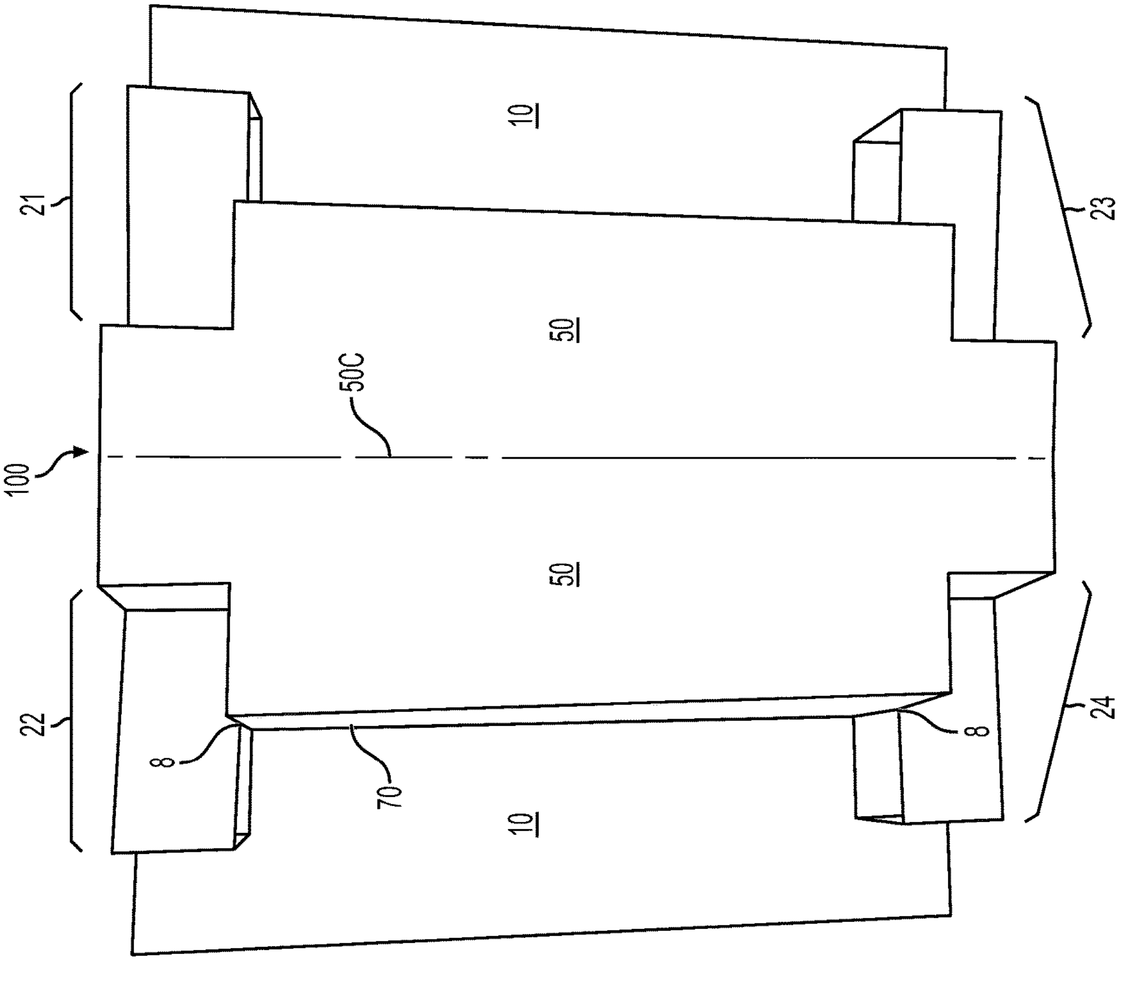

FIGS. 2A and 2B depict an embodiment of display board 100 in a display configuration from a front view and a back view (slightly from the side), respectively. As may readily be observed, display board 100 may be self-standing in the display configuration.

Figure 3A:
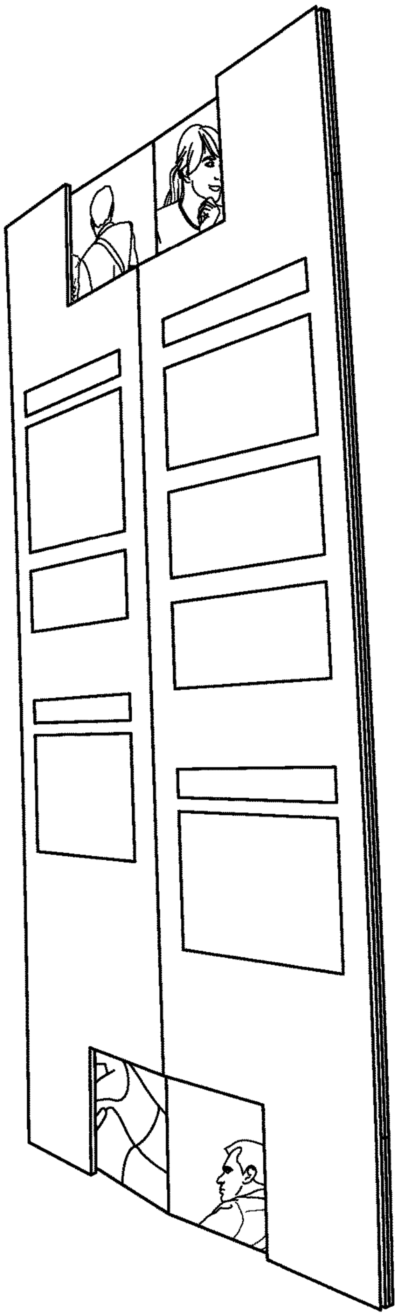
FIGS. 3A and 3B are drawings of a display board specimen in fully closed and half-closed configurations, respectively, in accordance with exemplary embodiments.
Figure 3B:
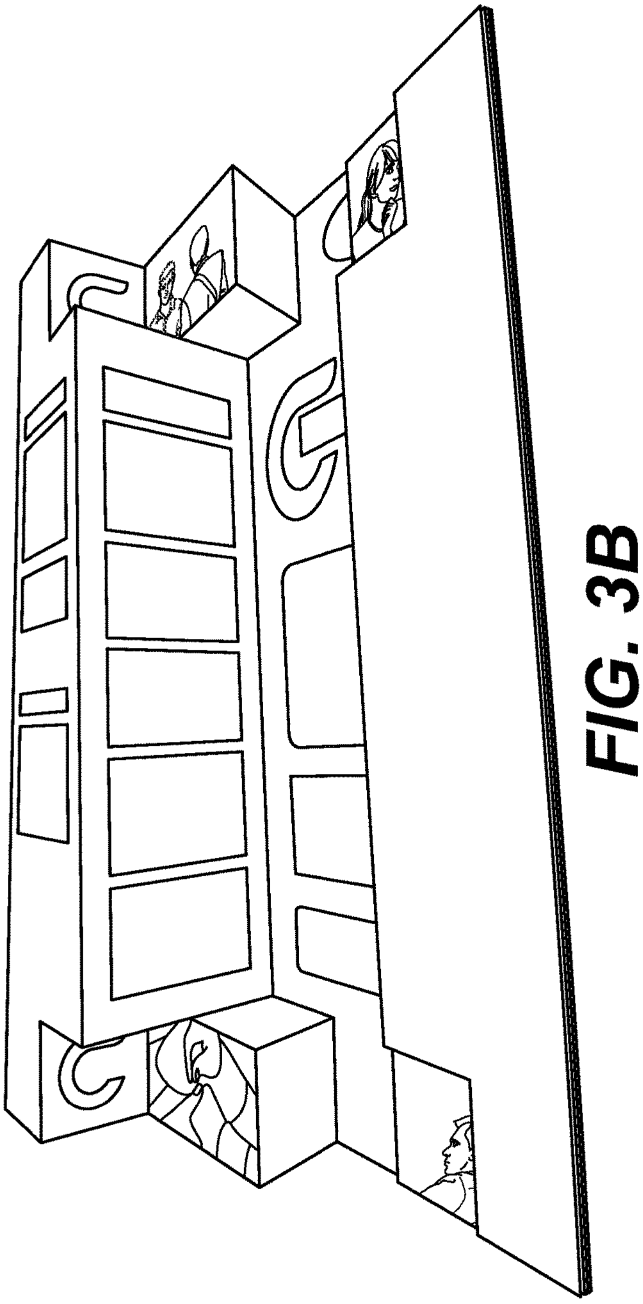
Figure 3C:
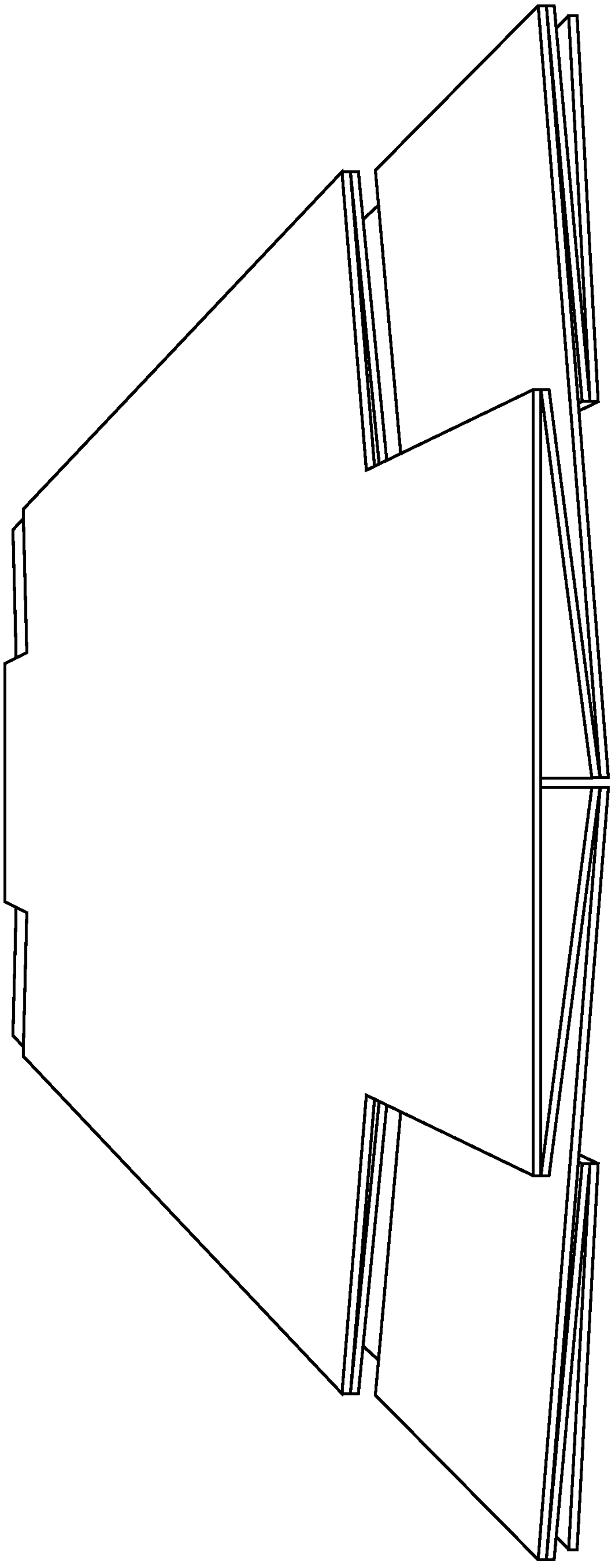
FIGS. 3C and 3D are drawings of a display board specimen in a fully closed configuration from backside bottom perspective and backside views, respectively, in accordance with exemplary embodiments.
Figure 3D:
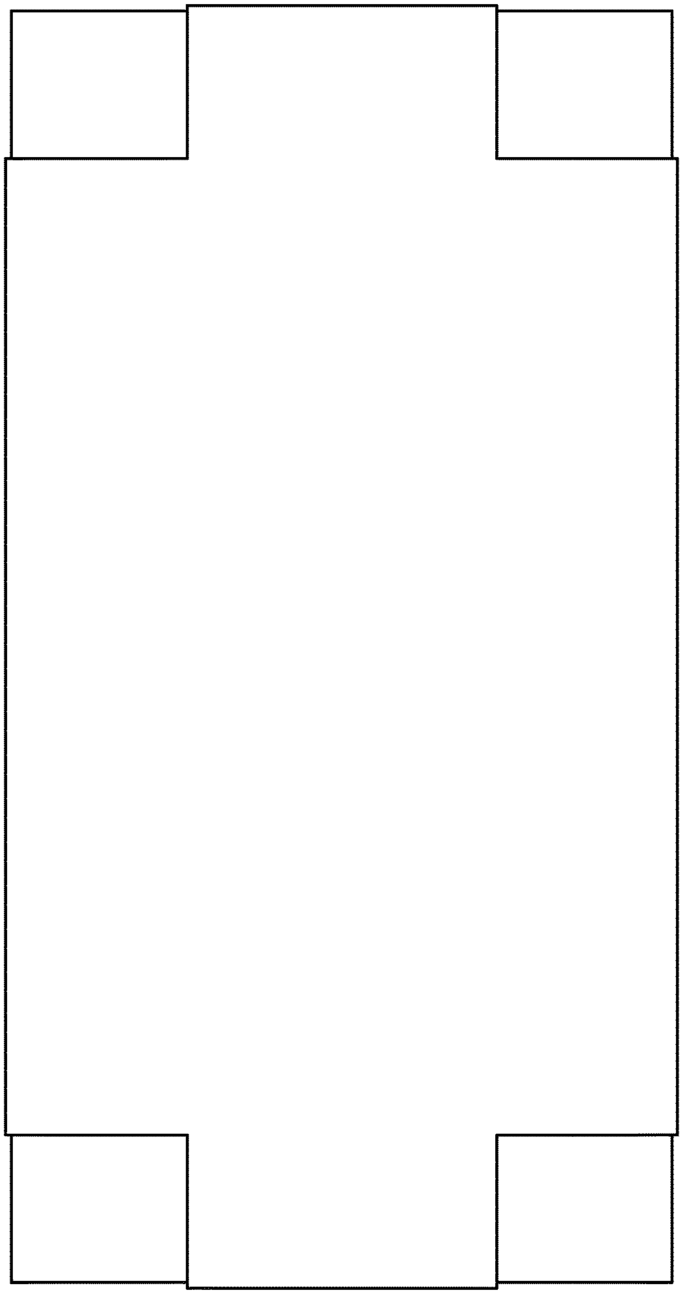
Figure 3E:
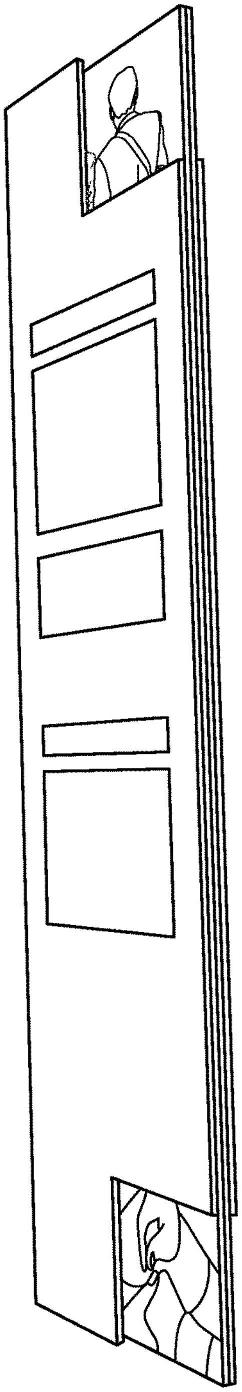
FIG. 3E is a drawing of a display board specimen embodiment in a compact configuration, in accordance with exemplary embodiments.

FIGS. 3A, 3C, and 3D depict the embodiment of display board 100 in a closed configuration from various perspectives. FIG. 3B depicts the embodiment of display board 100 in half-closed configuration. FIG. 3E depicts an embodiment of display board 100 in a compact configuration.

With reference to FIGS. 2A and 2B, display board 100 may comprise left panel 10, left-middle panel 30, center panel 50, right-middle panel 70, and right panel 90. Display board may also comprise left-top fold section 21, right-top fold section 22, left-bottom fold section 23, and/or right-bottom fold section 24.

Figure 1:
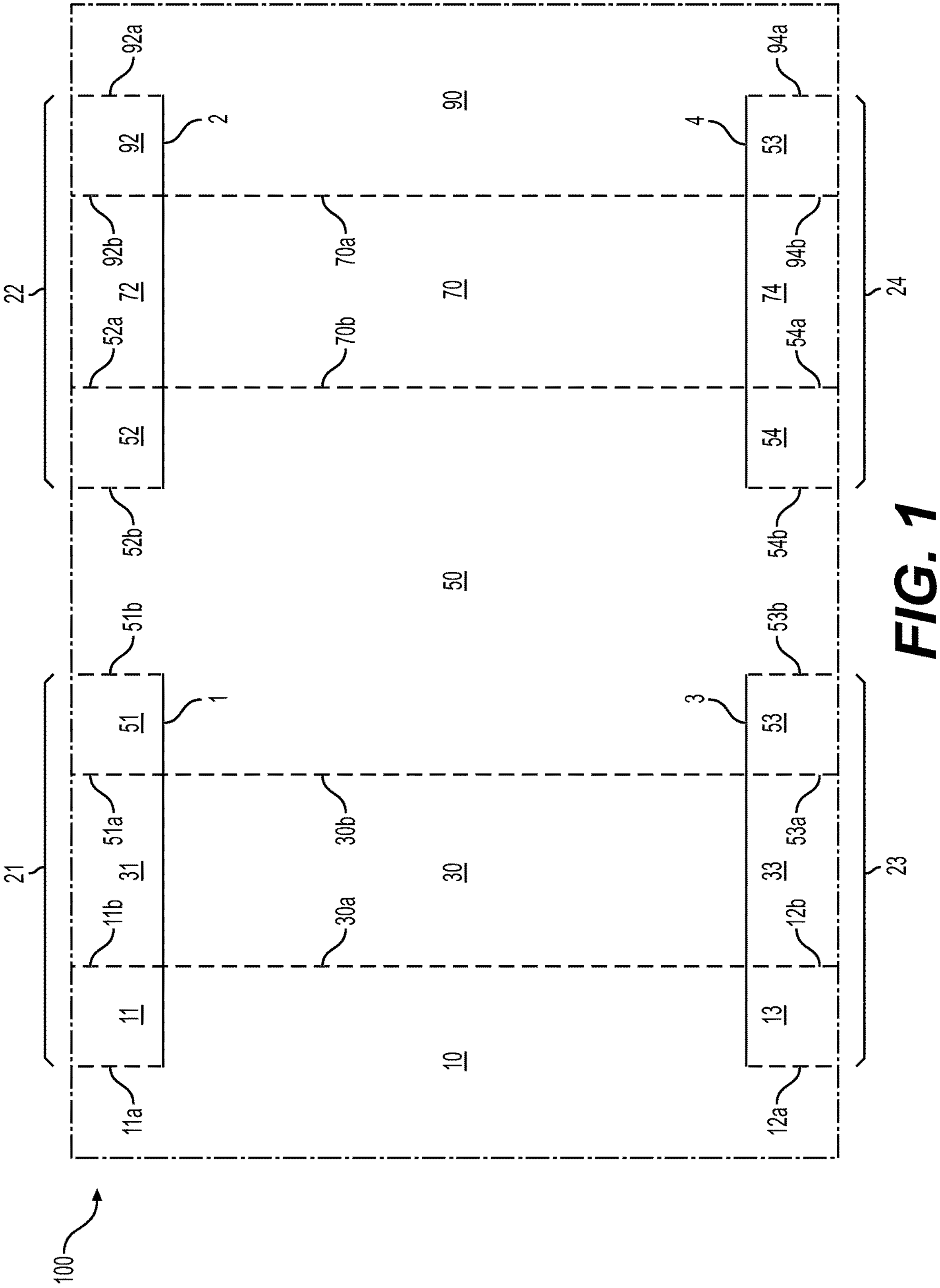
FIG. 1 is a schematic of a display board in a fully open configuration, in accordance with exemplary embodiments.

FIG. 1 depicts an embodiment of display board 100 in a fully open configuration. In FIG. 1, exemplary top, bottom, left and right boundaries of display board 100 are denoted in dash-dot lines; exemplary cuts made through the board are denoted in solid lines; and exemplary creases/folds are denoted in dashed lines. It is contemplated that in some alternative embodiments the boundaries of display board 100 may be embody various shapes for enhanced visual effect of a display board 100.

The bottom of left-top fold section 21 may be separated from left panel 10, left-middle panel 30, and center panel 50 by cut-through 1. Left-top fold section 21 may comprise left-top fold panel 11, left-top middle fold panel 31, and left-top center fold panel 51.

The bottom of right-top fold section 22 may be separated from center panel 50, right-middle panel 70, and right panel 90 by cut-through 2. Right-top fold section 22 may comprise right-top fold panel 92, right-top middle fold panel 72, and right-top center fold panel 52.

The top of left-bottom fold section 23 may be separated from left panel 10, left-middle panel 30, and center panel 50 by cut-through 3. Left-bottom fold section 23 may comprise left-bottom fold panel 13, left-bottom middle fold panel 33, and left-bottom center fold panel 53.

The top of right-bottom fold section 24 may be separated from center panel 50, right-middle panel 70, and right panel 90 by cut-through 4. Right-bottom fold section 24 may comprise right-bottom fold panel 94, right-bottom middle fold panel 74, and right-bottom center fold panel 54.

As may be observed in, for example, FIGS. 2A and 2B, each panel may connect to one or more horizontally adjacent panels via a crease/fold that may comprise either an interior orientation or exterior orientation, when display board 100 is in the display configuration, closed configuration, and/or the like. An interior orientation of two abutting panels may be understood to indicate that the back sides of such panels face away each other in the display configuration and in the closed configuration. The angle formed by interior oriented panels may be understood to "point" towards the backside of display board 100, except when in an open configuration. An exterior orientation of two abutting panels may be understood to indicate that the front sides of such panels face away each other in the display configuration and in the closed configuration. The angle formed by exterior oriented panels may be understood to "point" toward the front (display) side of display board 100, except when in an open configuration. For example, with reference to FIG. 2A, left panel 10 and center left panel 30 may be understood to intersect in an exterior orientation, and center panel 50 and center left panel 30 may be understood to intersect in an interior orientation. In certain embodiments, it may be preferred that no images cross the crease/fold of an exterior orientation because such image may appear split or broken on display board 100 when in the display configuration. In the display configuration, the interior and exterior angles may be at approximately 90 degrees and up to 135 degrees in various preferred embodiments.

FIG. 2C depicts detail of two display board 100 panels intersecting in an interior orientation from a top/back perspective view. In this example, display board 100 comprises corrugated plastic with cut board surface 6 (here the back of display board 100), uncut board surface 5 (here the front of display board 100), and corrugations 7. As may be observed, the crease/fold may be embodied by cut board surface 6, which enables "pointing towards" towards cut board surface 6 and away from uncut board surface 5 when in display configuration, fully closed configuration, half-closed configuration, compact configuration, and/or the like.

With reference to FIG. 1, depicted fold/crease elements ending with "a" may be understood to be creases/folds configured to make an exterior orientation, and recited elements ending with "b" may be understood to be creases/folds configured to make an interior orientation. In certain preferred embodiments, images and/or text extending across exterior orientations should generally be avoided, because such images and/or text may be split when is display board 100 is in a display configuration. For similar reasons, images and/or text extending across full cut throughs 1/2/3/4 should generally be avoided.

In certain alternative embodiments, interior and exterior orientations may be reversed. In such embodiments, for example, with reference to FIG. 1, elements ending with "a" could be understood to be creases/folds configured to make an interior orientation and elements ending with "b" could be understood to be creases/folds configured to make an exterior orientation. Further, in some alternative embodiments, interior and exterior orientations may be reversed on one of the left or right halves of display board 100.

As may be viewed in, for example, FIGS. 2A and 2B a central crease/fold 50C (not shown in FIG. 1, 3B, or 3C) may vertically bisect center panel 50 in certain embodiments. It is contemplated that central crease/fold 50C may be utilized to further decrease the footprint of display board 100 in a compact configuration, thereby improving portability or storability. FIG. 3E depicts an embodiment of display board 100 in a compact configuration wherein central crease/fold 50C folds toward the back of center panel 50. In such embodiment, central crease/fold 50C may be cut on the front side of center panel 50 (e.g., with the front of center panel 50 serving as cut board surface 6). In such embodiments, central crease/fold 50C may be taped on the front side of display board 100 before deployment into the display, closed, and/or partially closed configurations to avoid (or limit) any undesirable folding or bending of center panel 50 in such configurations. However, this embodiment may be somewhat disfavored because images on the front of center panel 50 may be cut and because tape on the front of center panel 30 may obscure graphics or otherwise decrease their aesthetic appeal.

In alternative embodiments enabling a compact configuration, central crease/fold 50C may enable the front bisected portions of central panel 50 to fold together to avoid interference with images printed or otherwise provided on central panel 50. For example, central crease/fold 50*c* may be cut on the back side of center panel 50 (e.g., with the back of center panel 50 serving as cut board surface 6). This may avoid a cut in the middle of the front of center panel 50. In such embodiments, central crease/fold 50*c* may be taped on the back side of display board 100 before deployment into the display, closed, and/or partially closed configurations to avoid (or limit) any undesirable folding or bending of center panel 50 in such configurations.

In some embodiments, one or more of fold sections 21/22/23/24 may be omitted. Additionally or alternatively, it is contemplated that additional internal fold sections may be added, for example, for aesthetical appeal or additional structural support. For example, an internal fold section may be separated from left panel 10, left-middle panel 30, and center panel 50 by a top cut-through on one side and a bottom cut-through on the other; an internal fold section may be separated from right panel 90, right-middle panel 70, and center panel 50 by a top cut-through on one side and a bottom cut-through on the other; and/or the like.

In certain exemplary embodiments, display board 100 may be commercially offered in a variety of scaled sizes. With reference to FIG. 1, a display board 100 may be 8 units high and 12 units wide. Left panel 10 and right panel 90 may be 8 units high and 2 units wide. Left middle panel 30 and right middle panel 70 may be 6 units high and 2 units wide. Center panel 50 may be 8 units high and 4 units wide. Each fold section 21/22/23/24 may be 1 unit high and 4 units wide, with the middle fold panels 31/72/33/74 each being 1 unit high and 2 units wide and the remaining fold section panels 11/51/13/53/52/92/54/98 each being 1 unit high and 1 unit wide. With reference to FIG. 1, each unit may be 6'×6', but this disclosure is not so limited. Larger and smaller units, including measurements of approximately 5'×5', 4'×4', 3'×3' and/or the like are specifically contemplated. Further, it is contemplated that such units may comprise non-square rectangles in certain embodiments.

In other exemplary embodiments, a shorter, squatter display board 100 is contemplated. For example, a display board 100 may be 6 units high and 12 units wide; it is contemplated that, with respect to the unit measurements discussed in the paragraph above with respect to FIG. 1, Panels 10/30/50/70/90 may each be 2 units shorter. In alternative embodiments, panels 10/30/50/70/90 be 1 or 3 units shorter.

As noted above with reference to FIG. 2C, certain preferred embodiments of display board 100 may substantially comprise corrugated plastic. The use of such material may beneficially enable direct printing on the substrate material. Further, such corrugated plastic is relatively inexpensive, durable, and readily enables the formation of bendable joints to use as creases/folds. For example, with reference to FIGS. 2C, a crease/fold can be readily created by cutting a single outer layer of the corrugated plastic (i.e., cut board surface 6) and preferably a single fluting chamber. Use of corrugated plastic may advantageously enable each display board 100 to be formed from a single piece of material, rendering the use of glue, tape, or the like unnecessary in some embodiments. In alternative embodiments, display board 100 may substantially comprise foam core board. In such embodiments, for example, foam core may be scored to form joints; however, the use of glue, tape, or the like may be advisable to improve durability and structural stability. Other base materials such as corrugated cardboard are alternatively contemplated.

Figure 4D:
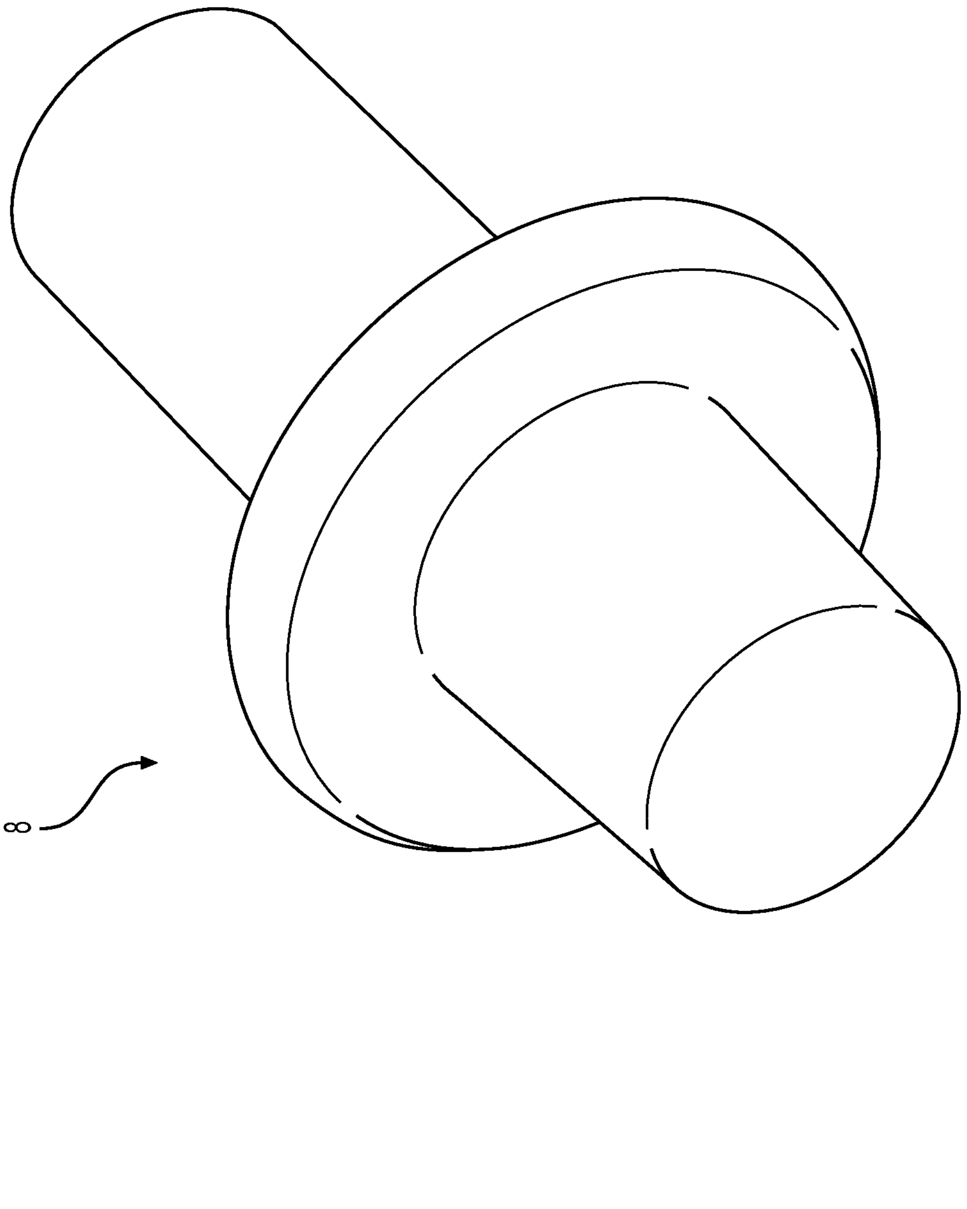
FIG. 4 is a drawing of an embodiment of a pin, which may be used to secure a display board specimen in certain configurations, in accordance with exemplary embodiments.

In some embodiments, one or more pins 9 may be inserted into the fluting at and/or adjacent to locations 8 where display board 100 sections intersect in the display configuration. For reference, locations 8 are depicted in FIGS. 2A and 2B, and an embodiment of pin 9 is depicted in FIG. 4. Such use of one or more pins 9 may further improve stability of display board 100 while on display. The diameter of pin 9 may be preferably sized to snugly, but removably fit within the board 100 fluting. It is contemplated that such "pins" may be relatively easy to adjust and/or remove, or alternatively, glued or otherwise secured into the fluting on one side. It is contemplated that such "pins" may be made of metal, plastic, and/or wood in various embodiments. Uxcell Cabinet 4 mm Pin Dia 304 Stainless Steel Round Shelf Holder Support Pins (available at https://www.amazon.com/ uxcell-Cabinet-Stainless-Holder-Support/dp/B01MY8O4A7) may serve as exemplary pins 9 in certain embodiments. Additional configurations where pin(s) 9 may be used to secure multiple display boards 100 together or secure one or more display boards 100 to a table or other surface are contemplated.

Exemplary Methods of Manufacture

A piece of suitable material, such as a single sheet of corrugated plastic, may be provided at the proper size. Consistent with certain preferred embodiments, a corrugated plastic sheet manufactured by Coroplast®, such as Part number RPA40WB2442, 96"×48" [c] in white may be utilized. It may be preferred for the fluting in such corrugated material be positioned to run vertically to ensure proper structure and flexibility in the final display board 100 product.

The display design may be printed or otherwise affixed to the material. In some embodiments, for example, where a blank display board 100 is desired, this step may be omitted.

The board may be cut to form appropriate cut-throughs (e.g., cut-throughs 1/2/3/4) as appropriate for the design, for example, as depicted in FIG. 1. If alternatively shaped boundaries for display board 100 are desired, they may also be cut-through, with excess material removed, or alternatively utilized to "pop-out" in display configuration.

The board may be scored, for example via grooving tools, laser, cutting tools, and/or the like to form the desired creases/folds, for example, as depicted in FIG. 1. It is contemplated that this step may occur on both the front and back sides of the board to ensure that exterior and interior orientations are appropriately arranged.

Once cut and scored, display board 100 may be considered formed, but in a fully open configuration. It may then be appropriately folded into the closed configuration (or compact configuration), dropped into a protective sleeve and/or other appropriate packaging, and/or prepared for shipping.

Exemplary Methods of Use

Putting display board 100 into the display configuration from the closed configuration is quick and simple. A display board 100 in the closed configuration 100 (e.g., FIG. 3A) may be stood up into a vertical position. Then, a presenter need only pull left panel 10 and right panel 90 away from each other until the various respective panels intersect at angles approximating 90 degrees or greater. At angles of less than 90 degrees, certain panels and portions thereof might be difficult to view. However, at angles approaching 135 degrees and/or greater, display board 100 may lose stability, the ability to self-stand, and/or the like. Then, as in FIG. 2A, display board 100 is in the display configuration.

Returning display board 100 into the closed configuration from the display configuration is also quick and simple. A presenter need only bring left panel 10 and right panel 90 together until crease/folds 30*a* and 70*a* are substantially adjacent. Then, a presenter can simply place the display board 100 on a flat surface. As in FIGS. 3A, 3C and 3D, display board 100 is in the closed configuration; it is ready for packaging, transport, storage, and/or redeployment.

ADDITIONAL AND/OR ALTERNATIVE EMBODIMENTS AND ENHANCEMENTS

Due to the lightweight nature of certain contemplated embodiments of display board 100, gusts of wind could topple the display if, for example, a presentation occurs in an outdoor area. To accommodate such uses, a wind stability base add-on is specifically contemplated. For example, a plastic slotted base may be crafted with grooves or similar structures to fit and grasp the bottom surfaces of display board 100 in the display configuration. In this manner, toppling risk may be reduced.

It is contemplated that holographic prints may be affixed to display board 100. In certain of such embodiments, display board 100 may be configured such that a plurality panels comprising holographic prints could be directed toward a single point. Such a configuration may enable a 3-dimensional hologram and enhance the visual appearance of a display board 100.

In some embodiments, electronic lighting or display elements, such as LEDs, OLEDs, E-Ink's reflective electrophoretic E technology displays, lightweight videos screens, and/or the like, may be integrated into a display board 100 without substantially undermining its aforementioned advantageous characteristics. For example, in some embodiments, electronic display elements or wiring may be provided within fluting of corrugated materials.

Outside of the presentation board context, the above-described structures and methods may be used in a variety of other applications. For example, stable, readily deployable walls for use in emergency shelters, military applications, landscaping, social events, and/or the like based on the structures disclosed herein are contemplated.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the disclosure. It is also to be understood that the terminology used herein is for the purpose of describing particular aspects only, and is not intended to be limiting, since the scope of the present invention will be limited only by claims.

It is noted that, as used herein, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure. Any recited method can be carried out in the order of events recited or in any other order that is logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of this disclosure. The specification and drawings are accordingly to be regarded in an illustrative rather than restrictive sense.

We claim:

1. A display board comprising:

a left panel;

a left-middle panel;

a center panel;

a right-middle panel;

a right panel;

a left-top fold section;

a right-top fold section;

a left-bottom fold section;

a right-bottom fold section; and a bottom board edge, the bottom board edge comprising a bottom-most boundary of the left panel, the left-bottom fold section, the center panel, the right-bottom fold section, and the right panel, wherein:

the display board is configured to be placed in at least a display configuration and a closed configuration;

a bottom edge of the left-top fold section is defined by a continuous cut that is parallel to the bottom board edge, that extends fully through the left-middle panel, and that extends partially though each of the left panel and the central panel;

a bottom edge of the right-top fold section is defined by a continuous cut that is parallel to the bottom board edge, that extends fully through the right-middle panel, and that extends partially though each of the right panel and the central panel;

a top edge of the left-bottom fold section is defined by a continuous cut that is parallel to the bottom board edge, that extends fully through the left-middle panel, and that extends partially though each of the left panel and the central panel;

a top edge of the right-bottom fold section is defined by a continuous cut that is parallel to the bottom board edge, that extends fully through the right-middle panel, and that extends partially though each of the right panel and the central panel;

in the display configuration, the display board is deployed to stand upon a plane;

in the display configuration the left panel and the left-middle panel, the left-middle panel and center panel, the center panel and the right-middle panel, and the right-middle panel and the right panel each intersect at an angle between 90 and 135 degrees, in the display configuration, each of the left panel, the left-middle panel, the center panel, the right-middle panel, and the right panel are disposed perpendicular to the plane; and the first fold section comprises a plurality of fold panels; and in the display configuration, each of plurality of fold panels are disposed perpendicular to the plane.

2. The display board of claim 1, wherein:

the left panel and the left-middle panel intersect with an exterior orientation;

the left-middle panel and the center panel intersect with an interior orientation;

the right-middle panel and the center panel intersect with the interior orientation; and the right panel and the right-middle panel intersect with the exterior orientation, wherein:

front sides of panels that intersect with the exterior orientation face away from each other in the display configuration and in the closed configuration; and back sides of panels that intersect with the interior orientation face away each other in the display configuration and in the closed configuration.

3. The display board of claim 1, wherein:

the left-top fold section further comprises a left-top fold panel, a left-top middle fold panel, and a left-top center fold panel;

the right-top fold section further comprises a right-top fold panel, a right-top middle fold panel, and a right-top center fold panel;

the left-bottom fold section further comprises a left-bottom fold panel, a left-bottom middle fold panel, and a left-bottom center fold panel; and the right-bottom fold section further comprises a right-bottom fold panel, a right-bottom middle fold panel, and a right-bottom center fold panel.

4. The display board of claim 2, wherein:

the left-top fold section further comprises a left-top fold panel, a left-top middle fold panel, and a left-top center fold panel;

the right-top fold section further comprises a right-top fold panel, a right-top middle fold panel, and a right-top center fold panel;

the left-bottom fold section further comprises a left-bottom fold panel, a left-bottom middle fold panel, and a left-bottom center fold panel;

the right-bottom fold section further comprises a right-bottom fold panel, a right-bottom middle fold panel, and a right-bottom center fold panel;

the left-top fold panel and the left-top middle fold panel intersect with an interior orientation;

the left-top middle fold panel and the left-top center fold panel intersect with an exterior orientation;

the right-top fold panel and the right-top middle fold panel intersect with an interior orientation;

the right-top middle fold panel and the right-top center fold panel intersect with an exterior orientation;

the left-bottom fold panel and the left-bottom middle fold panel intersect with an interior orientation;

the left-bottom middle fold panel and the left-bottom center fold panel intersect with an exterior orientation;

the right-bottom fold panel and the right-bottom middle fold panel intersect with an interior orientation; and the right-bottom middle fold panel and the right-bottom center fold panel intersect with an exterior orientation.

5. The display board of claim 4, wherein:

a front surface of the display board contains imagery; and the imagery does not span across any panel intersection that corresponds to the exterior orientation.

6. The display board of claim 4, wherein:
the display board comprises of corrugated plastic with vertically oriented fluting;
a back surface of the display board is cut at each panel intersection that corresponds to an interior orientation; and
a front surface of the display board is cut at each panel intersection that corresponds to an exterior orientation.

7. The display board of claim 4, wherein:
the display board comprises of foam core board;
a back surface of the display board is scored at each panel intersection that corresponds to an interior orientation; and
a front surface of the display board is scored at each panel intersection that corresponds to an exterior orientation.

8. The display board of claim 4, further comprising:
a central fold within the center panel, wherein:
the central fold is parallel to and positioned between a first edge of the central panel that abuts the left middle panel and a second edge of the central panel that abuts the right middle panel; and
a back surface of the display board is scored or cut along the central fold.

9. The display board of claim 4, further comprising:
a central fold within the center panel, wherein:
the central fold is parallel to and positioned between a first edge of the central panel that abuts the left middle panel and a second edge of the central panel that abuts the right middle panel; and
a front surface of the display board is scored or cut along the central fold.

10. A display board comprising:
a left panel;
a left-middle panel;
a center panel;
a right-middle panel;
a right panel; and
a first fold section;
wherein:
the display board is configured to be placed in at least a display configuration and a closed configuration;
in the display configuration, the display board is deployed to stand upon a plane;
in the display configuration the left panel and the left-middle panel, the left-middle panel and center panel, the center panel and the right-middle panel, and the right-middle panel and the right panel each intersect at an angle between 90 and 135 degrees,
in the display configuration, each of the left panel, the left-middle panel, the center panel, the right-middle panel, and the right panel are disposed perpendicular to the plane; and
the first fold section comprises a plurality of fold panels; and
in the display configuration, each of plurality of fold panels are disposed perpendicular to the plane.

11. The display board of claim 10, wherein:
the left panel and the left-middle panel intersect with an exterior orientation;
the left-middle panel and the center panel intersect with an interior orientation;
the right-middle panel and the center panel intersect with the interior orientation; and
the right panel and the right-middle panel intersect with the exterior orientation,
wherein:
front sides of panels that intersect with the exterior orientation face away from each other in the display configuration and in the closed configuration; and
back sides of panels that intersect with the interior orientation face away each other in the display configuration and in the closed configuration.

12. The display board of claim 11, wherein:
the first fold section further comprises a first outer fold panel, a first middle fold panel, and a first center fold panel;
the first outer fold panel and the first middle fold panel intersect with an interior orientation; and
the first middle fold panel and the first center fold panel intersect with an exterior orientation.

13. The display board of claim 12, further comprising:
a second fold section;
wherein:
the second fold section further comprises a second outer fold panel, a second middle fold panel, and a second center fold panel;
the second outer fold panel and the second middle fold panel intersect with an interior orientation; and
the second middle fold panel and the second center fold panel intersect with an exterior orientation.

14. The display board of claim 10, wherein:
the left panel and the left-middle panel intersect with an interior orientation;
the left-middle panel and the center panel intersect with an exterior orientation;
the right-middle panel and the center panel intersect with the exterior orientation; and
the right panel and the right-middle panel intersect with the interior orientation, the first fold section further comprises a first outer fold panel, a first middle fold panel, and a first center fold panel;
the first outer fold panel and the first middle fold panel intersect with an exterior orientation; and
the first middle fold panel and the first center fold panel intersect with an interior orientation,
wherein:
front sides of panels that intersect at the exterior orientation face away from each other in the display configuration and in the closed configuration; and
back sides of panels that intersect at the interior orientation face away each other in the display configuration and in the closed configuration.

15. The display board of claim 10, wherein:
a front surface of the display board contains imagery; and
the imagery does not span across any panel intersection that corresponds to the exterior orientation.

16. The display board of claim 10, wherein:
the display board comprises of corrugated plastic with vertically oriented fluting.

17. The display board of claim 10, wherein:
the display board comprises of corrugated plastic with vertically oriented fluting;
a back surface of the display board is cut at each panel intersection that corresponds to an interior orientation; and
a front surface of the display board is cut at each panel intersection that corresponds to an exterior orientation.

18. The display board of claim 10, wherein:
the display board comprises of foam core board;
a back surface of the display board is scored at each panel intersection that corresponds to an interior orientation; and a front surface of the display board is scored at each panel intersection that corresponds to an exterior orientation.

19. The display board of claim 10, further comprising:

a central fold within the center panel, wherein:

the central fold is parallel to and positioned between a first edge of the central panel that abuts the left middle panel and a second edge of the central panel that abuts the right middle panel; and a back surface of the display board is scored or cut along the central fold.

20. The display board of claim 10, further comprising:

a central fold within the center panel, wherein:

the central fold is parallel to and positioned between a first edge of the central panel that abuts the left middle panel and a second edge of the central panel that abuts the right middle panel; and a front surface of the display board is scored or cut along the central fold.

* * * * *